Patented July 1, 1941

2,247,572

UNITED STATES PATENT OFFICE 2,247,572

DENTAL INVESTMENT COMPOSITION

Paul Francis Collins, Columbus, Ohio, assignor, by mesne assignments, to Edmund A. Steinbock, Louisville, Ky.

No Drawing. Original application December 17, 1935, Serial No. 54,937. Divided and this application April 8, 1941, Serial No. 387,481

2 Claims. (Cl. 22—188)

This application is a division of my pending application, Serial No. 54,937 filed December 17, 1935, for Dental investment composition.

My invention relates to a dental investment composition and process of using the same. The composition is designed for use either in the formation of a mold or in the holding of metal pieces together during soldering. It is particularly advantageous in those casting operations wherein a metal or alloy thereof is embedded in a mold formed of the composition and metal cast thereagainst, though it is highly advantageous in the making of castings, such as inlays, plates and like and, as indicated above, in soldering operations.

In the prior art it has been customary to use dental investment compositions whose chief ingredients are siliceous refractory materials, such as silica, cristobalite and the like, and a calcium sulphate binder, such as plaster of Paris or the like. In addition to these ingredients, other materials, such as boric acid, graphite, asbestos fiber, pumice stone, coloring matter, et cetera, have been used singly or in combination, though ordinarily in substantially smaller proportions than the above chief ingredients.

Most of these prior art dental investment compounds have possessed some serious drawback. One of such drawbacks has had to do with the common practice of so making the compound that, during the heating preliminary to casting, it will have a combined setting and thermal expansion of sufficient amount to compensate for the shrinkage of the metal cast. The siliceous material normally used expands in a more or less linear fashion with an increase in temperature, a more or less sharp rise in thermal expansion occurring in the neighborhood of 800°–900° F. However, the calcium sulphate binders customarily used undergo a more or less linear straight line expansion until a temperature approximating the boiling point of water is reached, at which temperature the excess or mechanically combined water is driven off, with a consequent slight contraction. Following this slight contraction, expansion continues until that temperature is reached at which the first portion of the water of crystallization begins to be driven off. This is in the neighborhood of 560°–600° F. At approximately these temperatures, the calcium sulphate binder begins to shrink and continues to do so until a temperature of approximately 700° is reached. During this period, the calcium sulphate has what may be called a negative expansion. This can be demonstrated by the heating of a specimen formed of calcium sulphate to 700° F., at which time it will be shorter than its original length. At higher temperatures, this contraction becomes greater and greater.

The net result of this is that a dental investment compound formed of a siliceous refractory material and a calcium sulphate binder will, in the absence of any counteracting ingredients, fail to show a linear straight line expansion throughout the normal heating operations to which these compounds are subjected in present day practice. For example, a mixture composed of 40 per cent plaster of Paris and 60 per cent silica will show a drop of its expansion curve within the temperature range of 500°–800° F., due to the prevalence of the shrinkage effects of calcium sulphate. This drop is a substantial one and may even go below the zero line, though it may stop slightly above such line. On the other hand, with a mixture composed of 80 per cent silica and 15 per cent calcium sulphate, which will however produce an undesirably soft mold, there is practically no drop within this temperature range of 500°–800° F., which indicates the dominance of the thermal expansion of the silica. Thus, it can be seen that there is a wide variation in thermal expansion, not only in ultimate thermal expansion but in the degree of drop between the temperature ranges indicated.

The equipment available for burning-out and heat-soaking in the various dental laboratories today is of rather inefficient design and it is not at all unusual to find a difference in temperature of 400° F. in different parts of a given mold undergoing heat-treatment. This is due partly to the refractory nature of the mixture, to its poor heat conductivity and to the said commonly found inefficiency of design of the heating units.

With such a drop in the thermal expansion curve of the mold material and with such a variation in temperature in different parts of the mold material as 400° F. or less, it can be readily understood that certain parts of the mold might be reasonably expected to be expanding while other parts are contracting and vice versa. In any event, these combined conditions result in the setting up of strains within the mold and this in turn frequently results in cracks in the mold which are reproduced as fins in the casting gold as well as in the production of distorted castings.

As indicated above, the said undesirable drop in the thermal expansion curve might be prevented by using a formula of substantially higher silica content, such as 85 percent silica and 15 percent of plaster of Paris. Such a mixture, however, is extremely soft and would meet with serious objections from dental technicians. If, on the other hand, it is attempted to reduce the silica content with a consequent increase in the plaster of Paris content to the point where sufficient hardness is possessed by the mixture to meet the requirements of the dental technician, this results in a reduction of the thermal expansion of the mixture to some such percentage as 0.6 percent to 0.7 percent and, of course, the increase in the plaster of Paris content greatly accentuates the marked contraction within the temperature range of 500°–800° F.

Some attempt has been made to overcome this drop in the thermal expansion curve by the addition of a third material. However, such of these attempts as I am familiar with result in other draw-backs of a more or less serious nature.

For example, one of these attempts has involved the addition of boric acid to an investment composition of silica and plaster of Paris. It was claimed that the addition of boric acid eliminated the above described large contraction in the thermal expansion curve and made it possible to obtain a thermal expansion as high as 0.90 percent. However, the attainment of these results, calls for the use of such a high percentage of boric acid as to seriously impair other desirable and requisite physical properties such as porosity and setting expansion. These impairments are so serious that it has been found necessary or desirable to use only sufficient boric acid to give a thermal expansion of 0.72–0.75 percent. This in turn results in a drop in the expansion curve within the aforenamed temperature range which, though not so severe, is nevertheless undesirable.

Another attempt has involved the addition of a third ingredient such as sodium chloride to a compound embodying silica and plaster of Paris. However, though sodium chloride is desirable in some compositions, in others it has the drawback of unduly hastening the setting of the calcium sulphate binder. Thus, in a composition embodying a rapidly setting calcium sulphate binder, the setting of such binder is frequently hastened to such an extent that it is necessary to introduce a retarding agent which, of course, should be avoided if possible.

One of the objects of my present invention is to provide a dental investment compound wherein a siliceous refractory material and a calcium sulphate binder are used, with these materials being so proportioned that the composition will have a relatively high degree of thermal expansion accompanied by a degree of hardness satisfactory to the dental technician, while the thermal expansion curve will be substantially a linear straight line curve.

Another object of this invention is to provide a dental investment compound embodying siliceous refractory material and a calcium sulphate binder but embodying at least one other ingredient which will be effective to prevent any material drop in the thermal expansion curve, without materially possessing the above-described drawbacks of prior art investment compounds.

Another object of this invention is to provide a dental investment compound embodying a siliceous refractory material and a calcium sulphate binder wherein the danger of distortion and cracking of the mold during heating thereof will be minimized.

Another object of this invention is to provide a method of producing metal castings which will render possible the attainment of relatively high degree of thermal expansion with substantial freedom from distortion of the mold and with consequent attainment of more precisely fitting castings.

In one embodiment, my invention contemplates the provision of a dental investment compound embodying a siliceous refractory material and a calcium sulphate binder, together with barium chloride in proportion ranging from .1 to 2.0 percent of the investment formula, the exact percentage depending upon the relative percentages of the siliceous refractory material and the calcium sulphate binder as well as the specific form of these constituents which may be used. I have also found that magnesium chloride, copper chloride, or (but less advantageously) calcium chloride may be used in substantially the same percentages as substitutes for the barium chloride, being more or less desirable in accordance with the order in which they are named.

In the present case I employ the term "alkaline earth metal chloride" to embrace the chlorides of barium, calcium and also of magnesium, although I am aware that heretofore magnesium is often not included in the alkaline earth metals, although very many of the magnesium compounds have properties similar to those of the corresponding calcium compounds. As is well known, these chlorides are very difficultly reducible.

While copper chloride can be used to control thermal expansion I make no claims in the present case to copper chloride, the use of that in an investment composition being covered in the claims of my Patent 2,006,733, (notably claim 2 thereof).

The siliceous refractory material may range from 35 to 80 percent, as when silica is used, and the calcium sulphate from 19 to 55 percent, as where plaster of Paris is used. In addition to these ingredients, other materials such as graphite, asbestos fiber, pumice stone and coloring matter in quantities up to 15 percent may be used.

In another embodiment of my invention, I have utilized, in addition to a siliceous refractory material, a calcium sulphate binder and barium chloride or one of the other equivalent materials described above, a substance which I prefer to term a "protective reagent" which will either reduce materially the formation of sulphur gases or react with such gases in preference to embedded or cast metals to prevent corrosion of such embedded or cast metals and which will combine with any liberated oxygen to prevent such oxygen from attacking the embedded or cast metals. The protective reagents which will be effective to accomplish these results are set forth in my Patent 2,006,733 of July 2, 1935. The amount of the protective reagent can vary. Usually quantities between 5% and 25% can be used, and preferably between 7% and 15%, as stated in the prior Patent 2,006,733.

In this form of my compound I have obtained a number of important results. While still maintaining the siliceous refractory material and the calcium sulphate binder in such proportions as to insure adequate thermal expansion coupled with adequate hardness, I have provided a maximum thermal expansion with a linear straight line expansion curve, as described above. In addition, I have provided a protection (hereinafter termed "protective constituent" for brevity) to protect the copper or other protective agent against oxidation. It is the latter protective reagent that protects the embedded or cast metals from corrosion due to sulphur. In this embodiment I also preferably utilize barium chloride or its named equivalents in proportion from .1 to 2.0 percent of the investment formula.

In this embodiment of my invention I have utilized what I term a "protective constituent" for the said protective reagent. In its preferred form this protective constituent is preferably a calcium carbonate. For example, of the number of pure metals which I have found to satisfactorily combine with or otherwise prevent the harmful effects of sulphur or sulphur gases, copper appears among the most practical when all factors are taken into consideration.

As long as such a compound embodying copper or like protective reagents is used in connection with a gas or gas-air oven for burning-out and heat-soaking invested work, no difficulties are experienced. The atmosphere surrounding the mold and the invested work is reducing at all times. However, where electric furnaces are used for burning-out and heat-soaking invested cases the atmosphere is principally neutral or tends to be slightly oxidizing. There are a few brief moments in burning-out in the electric furnace during which the wax being eliminated from the mold, in which the atmosphere in the interior of the mold itself may be reducing in character. However, the bulk of the mold composition, as well as the surrounding atmosphere within the furnace will be slightly oxidizing. Therefore, in heating a mold in an atmosphere such as the one described above from room temperature to some temperature between 1200° and 1600° F., it can be readily understood that the finely divided copper which has been incorporated in the investment composition will be strongly oxidized, probably before a red heat (1000°–1100° F.) has been reached. This tends to decrease the activity of this reagent in absorbing the harmful sulphur gases which will be liberated principally between the temperatures of 1200°–1600° F.

While my prior Patent No. 2,006,733 states that the metals used (e. g. copper) can be used in the condition of pure metal, metal oxide, alloys rich in copper, sulphur-free copper salts such as nitrate, etc., as protective reagent, the pure metals in a finely divided state are generally more active, i. e., they combine more promptly and more avidly with the reduced sulphur compounds than does the oxide, and hence are preferred. Accordingly where the metals (e. g. copper) are used in the metallic state, it is advisable to keep them in said state and thereby to retain their full activity. This is accomplished by means of my "protective constituent," such as calcium carbonate or equivalent.

Apparently, the copper having a high affinity for oxygen will take up the oxygen and thereby become less active in combining with sulphur. When temperatures are reached where appreciable quantities of sulphur gases are being liberated, e. g. 1200° to 1600° F., this protective reagent may otherwise be seriously reduced in activity so that its absorption of sulphur will be materially reduced or retarded. Thus, to prevent the occurrence of this undesirable condition I have introduced calcium carbonate into such a composition as a protective constituent for the copper or other equivalent protective reagent. The calcium carbonate decomposes at the higher temperatures involved and liberates carbon dioxide, which functions to prevent undue oxidation, so that the life of the metallic powder within the investment formula is prolonged.

The use of this calcium carbonate in the manner indicated should be distinguished from the prior art use of such materials as marble dust, wherein this marble dust was used as a refractory substance in these early investment compositions. These prior art compositions which utilized marble dust were mainly employed in such operations as soldering wherein the temperatures of the investment as a whole ordinarily did not exceed 800° to 1000° F. and wherein it was only necessary to be sure that the mold be thoroughly dried out before attempting the soldering operation. Under such conditions, it was safe to use the marble dust as the refractory ingredient, even in the relatively high percentages necessary for such a function.

However, when casting was introduced, more particularly the prevalent high-heat casting technique involving the burning-out and heat-soaking at temperatures of 1200°–1600° F., such mixtures as those involving the high percentages of marble dust necessary to enable it to serve as a refractory would be impracticable, since calcium carbonate begins to undergo a decomposition into calcium oxide and carbon dioxide at around 1300° F. to 1500° F. Furthermore, when the requirements of the present day practice of precision casting are considered, it would be impracticable to use large percentages of a substance of this nature, since it would not have the high thermal expansion properties required as a factor in compensating for the shrinkage of the cast metal. As a matter of fact, the decomposition which would occur would, in all probability, bring about undesirable contraction of the mold mixture as it approached the higher limits of burning-out, such as 1500° F. or above.

Thus, it should be understood that my calcium carbonate constituent is introduced for the protection of the protective reagent. Moreover, it is desirable that it not be used in excess of 10 percent by weight of the total investment compound. I prefer that it be used in percentages ranging from .1 to 5.0 percent by weight of the total investment compound. Larger amounts, such as 20 percent would protect the copper, but would reduce thermal expansion, and cause other troubles.

It will be understood that other constituents may be used as a substitute for the calcium carbonate in the composition just described. Thus, I may use lamp black, bone black, or graphite either alone or in combination with each other, or in combination together or individually with calcium carbonate. In place of the lamp black I can also use wood finely powdered or charcoal, although it is to be noted that such a material absorbs considerable water and the amount of water to be used in mixing up the investment paste would have to be somewhat increased. Wool flour or similar carbohydrate material could also be employed but somewhat more water would be needed. Lithium carbonate would function similarly to calcium carbonate. Accordingly, the use of these materials is intended to be covered in the claims. The total percentage of carbon can range from 0.1 percent to 1 percent.

Though I have described the use of calcium carbonate or an equivalent substance in a compound embodying a siliceous refractory material, a calcium sulphate binder, barium chloride and a protective reagent, it will be understood that it may be used in a compound wherein the barium chloride or equivalent thereof is omitted. It may also be utilized in such a compound where some other equivalent material is substituted for barium chloride.

In the performance of my method I preferably take any one of the above described compounds and, by the addition of moisture thereto, place it in such a condition that it may be molded into a wax pattern formed in any customary or desirabel manner, leaving a sprue hole into the cavity containing the wax. After the setting of the mold thus formed, the temperature thereof is gradually raised until it reaches the casting temperature. During the course of this increase in temperature, the wax pattern is melted and dissipated and the casting operation may then be performed in any approved manner.

Where casting against embedded metal is to be effected I affix the wax pattern to the metal and then mold the plastic compound about such embedded metal and wax pattern in any customary or desirable manner, leaving a sprue hole into the cavity containing the wax. After the setting of the mold thus formed the temperature thereof is gradually raised until it reaches the proper casting temperature. During the course of this increase in temperature the wax pattern is melted and dissipated and the casting operation may then be performed. In making dental castings it is common to use precious metals, e. g. gold and alloys of gold and of other precious metals. The term "dental metal" is intended to cover the metals in a pure state as well as alloys thereof such as are commonly used and/or suitable for the purpose.

In that form of my compound embodying a siliceous refractory material, a calcium sulphate binder and barium chloride or its equivalent, the thermal expansion curve will be found to be a more or less linear straight line curve which is free from any substantial drop and which is substantially regular at all sections thereof. In particular, it will be noted that the drop in expansion curve within the temperature range of 500°–800° F., commonly occurring in most prior art compounds under similar operating conditions will have been eliminated. In that form of my compound which embodies the additional protective reagent the same advantageous results will be found to exist and, in addition, any embedded or cast metals will be found to have superior physical properties due to their protection against corrosion and oxidation. In those compounds embodying the further additional elements of calcium carbonate or equivalent, a still further improvement will be noted in the physical properties of the embedded or cast metals. Even where the barium chloride is omitted superior results will be evident from the use of the calcium carbonate or equivalent as a protective material for the protective reagent.

The following specific formulas are given for the purpose of illustration, but without in any sense limiting the scope of the invention to these specific formulas. In these formulas equivalents, as stated above, can be substituted. Two sets of proportions will be given with each set of constituents.

|  | a | b |
|---|---|---|
| Silica | 73.5 | 53.0 |
| Calcium sulphate binder | 26.0 | 45.0 |
| Barium chloride | .5 | 2.0 |

|  | c | d |
|---|---|---|
| Silica | 59.0 | 45.5 |
| Calcium sulphate binder | 26.0 | 35.0 |
| Metallic copper | 10.0 | 12.0 |
| Calcium carbonate | 5.0 | 7.5 |

|  | e | f |
|---|---|---|
| Silica | 60.5 | 46.0 |
| Calcium sulphate binder | 26.0 | 30.0 |
| Metallic copper | 8.0 | 12.0 |
| Calcium carbonate | 5.0 | 10.0 |
| Barium chloride | 0.5 | 2.0 |

|  | g | h |
|---|---|---|
| Silica | 61.0 | 42.0 |
| Calcium sulphate | 25.9 | 35.0 |
| Metallic copper | 8.0 | 12.0 |
| Calcium carbonate | 5.0 | 10.0 |
| Lamp black | 0.1 | 1.0 |

|  | i | j |
|---|---|---|
| Silica | 64 | 51.0 |
| Calcium sulphate binder | 25.8 | 36.0 |
| Metallic copper | 10.0 | 12.0 |
| Lamp black | 0.2 | 1.0 |

|  | k | l |
|---|---|---|
| Silica | 65.5 | 45.5 |
| Calcium sulphate binder | 26.0 | 40.0 |
| Metallic copper | 8.0 | 12.5 |
| Barium chloride | .5 | 2.0 |

What is claimed is:

1. An investment composition for casting precious metals and their alloys, consisting principally of a siliceous refractory material and a calcium sulfate binder in such proportions as to give a dental investment composition and containing from .1 to 2.0 per cent calcium chloride.

2. A dental investment composition containing more than 50 per cent of a siliceous refractory material, a calcium sulfate binder, with the refractory material and the binder so proportioned as to give a dental investment composition and about 2 per cent of calcium chloride.

PAUL FRANCIS COLLINS.